(12) United States Patent
Wang

(10) Patent No.: US 11,535,690 B2
(45) Date of Patent: Dec. 27, 2022

(54) LIGHT CURING NON-TRANSPARENT MATERIAL FOR 3D PRINTING AND A PREPARATION METHOD THREROF, A 3D PRINTED PRODUCT AND A 3D PRINTER

(71) Applicant: ZHUHAI SAILNER 3D TECHNOLOGY CO., LTD., Zhuhai (CN)

(72) Inventor: Likun Wang, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 174 days.

(21) Appl. No.: 16/897,685

(22) Filed: Jun. 10, 2020

(65) Prior Publication Data
US 2020/0299440 A1    Sep. 24, 2020

Related U.S. Application Data

(63) Continuation of application No. PCT/CN2018/120365, filed on Dec. 11, 2018.

(30) Foreign Application Priority Data

Aug. 20, 2018 (CN) .......................... 201810950258.6

(51) Int. Cl.
*C08F 220/18* (2006.01)
*B33Y 70/00* (2020.01)
*B29C 64/314* (2017.01)
(Continued)

(52) U.S. Cl.
CPC .......... *C08F 220/18* (2013.01); *B29C 64/112* (2017.08); *B29C 64/314* (2017.08);
(Continued)

(58) Field of Classification Search
CPC ......... B33Y 10/00; B33Y 40/00; B33Y 70/10; B33Y 70/00; B29C 64/112; B29C 64/20;
(Continued)

(56) References Cited

U.S. PATENT DOCUMENTS 6,586,491 B2 * 7/2003 Husemann ........ C08F 220/1808
525/218
2015/0025877 A1   9/2015 Chan
(Continued)

FOREIGN PATENT DOCUMENTS

CA      3050305 A1 *  1/2020   ............ B22F 1/0022
CN      101709181 A    5/2010
(Continued)

OTHER PUBLICATIONS

International Search Report for PCT/CN2018/120365.
First Office Action of the prior Chinese application.
Notice of Allowance of the priority Chinese application.
First Office Action of Corresponding JP application.

*Primary Examiner* — Nahida Sultana
(74) *Attorney, Agent, or Firm* — J.C. Patents

(57) ABSTRACT

The present disclosure provides a light curing non-transparent material for 3D printing and a preparation method thereof, a 3D printed product and a 3D printer. The light curing non-transparent material for 3D printing provided by the present disclosure can be used to print non-transparent 3D printed products without adding white pigments such as white pigments powder, and therefore has the characteristic of high stability, and also ensures fluency of the 3D printing process, good quality of the 3D printed products, as well as good performances of the 3D printer that containing light curing non-transparent material for 3D printing.

12 Claims, 1 Drawing Sheet

(51) Int. Cl.
    *B29C 64/112*     (2017.01)
    *B33Y 40/10*     (2020.01)
    *C08K 5/1535*     (2006.01)
    *C08K 5/5415*     (2006.01)
    *C08L 33/10*     (2006.01)
    *B33Y 30/00*     (2015.01)
    *B29K 33/00*     (2006.01)

(52) U.S. Cl.
    CPC ............... *B33Y 40/10* (2020.01); *B33Y 70/00* (2014.12); *C08K 5/1535* (2013.01); *C08K 5/5415* (2013.01); *C08L 33/10* (2013.01); *B29K 2033/08* (2013.01); *B29K 2995/0025* (2013.01); *B29K 2995/0082* (2013.01); *B29K 2995/0089* (2013.01); *B33Y 30/00* (2014.12); *C08L 2201/08* (2013.01)

(58) Field of Classification Search
    CPC ... B29C 64/291; B29C 64/314; C08F 220/18; C08F 2/44; B29K 2033/08; B29K 2995/0025
    See application file for complete search history.

(56) References Cited

U.S. PATENT DOCUMENTS

| | | | |
|---|---|---|---|
| 2016/0096980 A1* | 4/2016 | Wieneke | C09J 133/08 |
| | | | 156/289 |
| 2018/0037783 A1* | 2/2018 | Talamoni | C08F 220/1808 |
| 2020/0087443 A1* | 3/2020 | Wang | C08F 32/06 |

FOREIGN PATENT DOCUMENTS

| | | |
|---|---|---|
| CN | 102993824 A | 3/2013 |
| CN | 103189187 A | 7/2013 |
| CN | 105017492 A | 11/2015 |
| CN | 106866891 A | 6/2017 |
| CN | 107459864 A | 12/2017 |
| CN | 107501477 A | 12/2017 |
| CN | 108250367 A | 7/2018 |
| CN | 108329683 A | 7/2018 |
| JP | 2016210951 A | 12/2016 |
| JP | 2017213812 A | 12/2017 |

\* cited by examiner

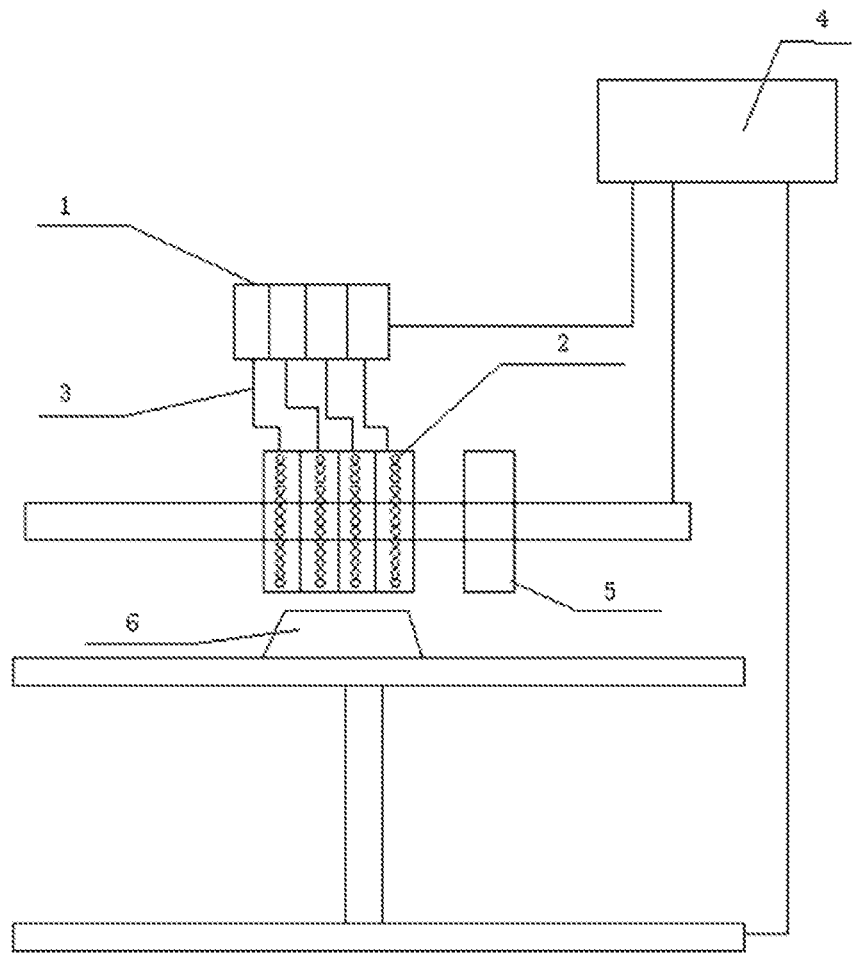

LIGHT CURING NON-TRANSPARENT MATERIAL FOR 3D PRINTING AND A PREPARATION METHOD THREROF, A 3D PRINTED PRODUCT AND A 3D PRINTER

CROSS-REFERENCE TO RELATED APPLICATIONS

This application is a continuation of International Application No. PCT/CN2018/120365, filed on Dec. 11, 2018, which claims priority to Chinese Patent Application No. 201810950258.6, filed on Aug. 20, 2018, both of which are hereby incorporated by reference in their entireties.

TECHNICAL FIELD

The present disclosure related to 3D printing technology, and specifically related to a light curing non-transparent material for 3D printing and a preparation method thereof, a 3D printed product and a 3D printer.

BACKGROUND

Materials (or referred to as inks), used in existing 3D printing technology such as 3D inkjet printing technology, light curing stereolithography technology (abbreviated as SLA technology), projector digital light processing technology (abbreviated as DLP technology), and the like, can be classified into two categories of transparent materials and non-transparent materials according to the distinction on the transparency of a printed test block. The transparent materials include colorless transparent materials and color transparent materials (with colors formulated by the three primary colors C, M and Y), the non-transparent materials include white materials and color non-transparent materials.

In practical applications, 3D printed products made from non-transparent materials are more accurate in the performance of color, As a result, there is a relatively high demand for non-transparent materials.

For the formulation of non-transparent materials, especially the formulation of light curing non-transparent materials, the most common practice is to add titanium white powder into a material composition to obtain white materials, or add titanium white powder together with red pigments, blue pigments, yellow pigments or other pigments into a material composition to obtain the color non-transparent materials with corresponding colors. Moreover, the transparency of 3D printed products mainly depends on the amount of titanium white powder added, generally with the addition of titanium white powder increases, the transparency of 3D printed products will be reduced.

The titanium white powder is a white pigment with titanium dioxide particles as a main component. As the density of the titanium white powder is greater than the density of other components in material composition, it is easy to be deposited, which leads to deterioration of the stability of the material. In particular, for the 3D inkjet printing technology, deposition of titanium white is very easy to cause clogging of a print nozzle of a print head, disconnection of the printing process, which not only affects the quality of 3D printed products, but also increases the maintenance costs of 3D printers.

Therefore, the development of a light curing non-transparent material with good stability to ensure the fluency of 3D printing process and the quality of 3D printed products is a problem needs to be solved urgently.

SUMMARY

In order to solve the above-mentioned defects in the prior art, the present disclosure provides a light curing non-transparent material for 3D printing. The non-transparent materials for 3D printing can be obtained without adding white pigments powder such as the titanium white powder, and therefore has the characteristic of high stability, and also ensures fluency of the 3D printing process.

The present disclosure provides a preparation method for the above light curing non-transparent material for 3D printing, and the method has a simple and feasible preparation process.

The present disclosure provides a 3D printed product, which has a good quality due to the use of the above light curing non-transparent material for 3D printing.

The present disclosure provides a 3D printer, the material container of the 3D printer contains the above light curing non-transparent material for 3D printing, which makes it possible to print smoothly and a nozzle hole of a print head cannot be easily clogged.

In order to achieve the above objectives, this disclosure provides a light curing non-transparent material for 3D printing, comprising components as follows:

30 to 70 parts by weight of a first acrylate component, 20 to 60 parts by weight of a second acrylate component, 0.5 to 5 parts by weight of a photoinitiator, 0.5 to 8 parts by weight of an additive, and 0 to 4 parts by weight of a colorant;

wherein the first acrylate component is a polar acrylate component, and the second acrylate component is selected from at least one of a weakly polar acrylate component and a non-polar acrylate component.

The light curing non-transparent material for 3D printing provided by this disclosure is homogeneous and transparent before the light curing and no macroscopic layering can be seen. Whereas, during the light curing, the polar first acrylate component and the weakly polar/non-polar second acrylate component are cross-linked and copolymerized due to the microphase separation principle, resulting in a polymer comprising a molecular chain containing both polar and weakly polar and/or non-polar segments. Due to the incompatibility between the segments with different polarities and the resulting repulsion effects between them, a phase separation occurs in the copolymer system, so the final 3D printed products are non-transparent. And at the same time, due to the phase separation of the copolymer system, the impact strength and toughness of 3D printed products is improved.

For the above reasons, the 3D printed products can be made non-transparent by using the light curing non-transparent material for 3D printing without adding white pigments such as titanium white powder. Therefore, when the white materials are required, white colorant may not be added to the materials; when the color non-transparent materials are required, an appropriate amount of colorant can be added accordingly. This solves the problem of reduced stability of the non-transparent material caused by the deposition of the added titanium white powder in the existing technology, thus improving the fluency of printing and avoiding the problems such as deteriorated printing precision, or incomplete structural printing in 3D printing process that using traditional non-transparent material due to the clog of the nozzle hole of the print head or disconnection of the printing process. Especially when printing color products, due to the improvement of printing accuracy and the non-transparency of the product itself, the color development is more accurate and will not be interfered by the adjacent color due to light transmittance, so the final 3D printed products also have very high quality.

At present, in this field, the distinction between transparent and non-transparent materials is generally based on the transparency of the printed test block obtained after the material has been cured. Usually print a test block with a thickness of 2 mm, if its transmittance is greater than or equal to 80% can be considered transparent, less than 80% can be considered non-transparent. Non-transparent materials may further include fully opaque materials (with a transmittance of 0 or close to 0), translucent materials (with a transmittance of 50%), and other materials that fall between transparent and fully opaque materials.

The light curing non-transparent material for 3D printing described in the present disclosure also follows the above-mentioned standards in this field and is transparent before the light curing and has light transmittance less than 80% after the light curing.

In the present disclosure, polar, non-polar and weakly polar substances are distinguished by the values of the dielectric constant. According to the general definition in this field, a dielectric constant of 3.6 is used as the division point between the polar and weakly polar substances. However, there is no clear division point between non-polar and weakly polar substances, usually a dielectric constant of 2.8 can be considered as the division point between them.

In accordance with the above definition, the dielectric constant of the first acrylate component is greater than or equal to 3.6, the dielectric constant of the second acrylate component is less than 3.6.

In general, within a certain range, the greater the polarity difference between the two acrylate components, the more favorable it is to obtain low light transmittance 3D printed products. It is speculated that the difference in polarity may be related to the degree of phase separation that occurs in the copolymer system, and thus the regulation of light transmittance in 3D printed products can be achieved by selecting the first acrylate component and the second acrylate component with appropriate polarity. In specific embodiments of the present disclosure, the dielectric constant of the second acrylate component commonly used is less than or equal to 3.

The transparency of the 3D printed product can be adjusted by adjusting the ratio between the two acrylate components, in addition to rational selection of the first acrylate component and the second acrylate component with appropriate polarity. A weight ratio between the second acrylate component and the first acrylate component is generally controlled to be less than 2:1.

In general, when the weight ratio between the second acrylate component and the first acrylate component is less than or equal to 1:2, a completely opaque material can be obtained, i.e., a material with a transmittance of 0 or close to 0; and when the weight ratio between the second acrylate component and the first acrylate component is more than 1:2 and less than 2:1, a material between a transparent material and a completely opaque material is obtained, i.e., a material with a transmittance of more than 0 and less than 80%, for example, when the weight ratio between the polar acrylate component and the weak polar acrylate component is 1:1, a translucent material is obtained, i.e., a material with a transmittance of 50%.

The first acrylate component used in the present disclosure can specifically be one or more of polar acrylate oligomers, or one or more of polar acrylate monomers, and also can be a mixture of at least one of the polar acrylate oligomers and at least one of the polar acrylate monomer.

Where, the polar acrylate oligomers can be one or more of aliphatic polyurethane acrylate oligomers and epoxy acrylate oligomers, and particularly the aliphatic polyurethane acrylate oligomers and/or epoxy acrylate oligomers with at least one polar group selected from cyano(—CN), carboxyl(—COOH), hydroxyl(—OH), acetylamino(—NHCOCH$_3$), amino (—NH$_2$) and sulfuryl (—SH) groups.

The aliphatic polyurethane acrylate oligomers used in the specific implementation of the present disclosure include, but are not limited to, the following: CN9021 NS, CN963B80, CN966J75 NS, CN985B88, CN991 NS, CN9167, CN970A60 NS from Sartomer, polyurethane acrylate oligomers 6101, 6103, 6153-1, 6155W, 6185, 5104D. DR-U011, DR-U012, DR-U250, DR-U381 from Taiwan Eternal Materials Co., Ltd., Unicryl R-7162 from WRAIO Chemicals, Genomer 1122, Genomer 4297, Greatech GT8010, Greatech GT8440, Greatech GT-8220, Greatech GT-8270 from Rahn AG, etc.

Specifically, the epoxy acrylate oligomers can be selected from one or more of bisphenol A epoxy acrylates and phenolic epoxy acrylates, etc. In specific embodiments of the present disclosure, the epoxy acrylate oligomers include, but are not limited to, the following: 623-100, 6231A-80, 625C-45 from Taiwan Eternal Materials Co., Ltd., CNI04, phenolic CN112C60 from Sartomer, etc.

Specifically, the polar acrylate monomers may be selected from at least one of hydroxyalkyl acrylate monomers, alkoxy acrylate monomers, and acrylate monomers with a heterocyclic structure.

Where, the above hydroxyalkyl acrylate monomers may be specifically selected from at least one of 2-hydroxyethyl acrylate (2-hydroxyethyl acrylate), 2-hydroxypropyl acrylate (2-acrylic acid-2-hydroxypropyl ester), 4-hydroxybutyl acrylate, and the like;

the alkoxylated acrylate monomers may be specifically selected from at least one of 2-acrylic-2-methoxy ester, ethoxyethoxyethyl acrylate, methoxy (polyethylene glycol) monoacrylate, methoxy (polyethylene glycol) methacrylate and alkoxylated nonylphenol acrylate;

the acrylate monomers with a heterocyclic structure may be specifically selected from at least one of tetrahydrofuran acrylate, 2-phenoxyethyl acrylate, (2-ethyl-2-methyl-1, 3-dioxolan-4-yl) acrylate and acryloyl morpholine.

The second acrylate component used in the present disclosure may be selected specifically from at least one of non-polar acrylate monomers, non-polar acrylate oligomers, weakly polar acrylate monomers and weakly polar acrylate oligomers. In particular, the second acrylate component may be selected from acrylate oligomers with a dielectric constant less than or equal to 3 and/or acrylate monomers with a dielectric constant less than or equal to 3.

The acrylate monomers with a dielectric constant less than or equal to 3 may be selected specifically from at least one of bisphenol A acrylate monomers, alkyl (meth) acrylate monomers, cycloalkyl (meth) acrylate monomers, etc., wherein:

the bisphenol A acrylate monomers may be selected specifically from acrylate monomers having a diphenol propane structure, such as BP-2EMK, BP-4EM, BP-IOEA, BP-4PA from Kyoeisha, Japan. SR601 NS, SR602 NS from Sartomer;

the alkyl (meth) acrylate monomers may be specifically selected from at least one of butyl acrylate, n-octyl acrylate, isooctyl acrylate, isoctadecyl acrylate, isononyl acrylate, lauric acrylate, isodecyl acrylate, isodecyl methacrylate ester, stearic acrylate, dodecyl methacrylate and isotridecyl methacrylate;

the cycloalkyl (meth) acrylate monomers may be specifically selected from at least one of isobornyl acrylate, isobornyl methacrylate, 1-adamantyl methacrylate, 4-tert-butyl cyclohexyl acrylate, and cyclohexyl methacrylate, etc.

The acrylate oligomers with a dielectric constant less than or equal to 3 may be specifically selected from at least one of bisphenol A acrylate oligomers, alkyl (meth) acrylate oligomers, cycloalkyl (meth)acrylate oligomers, etc., wherein:

The bisphenol A acrylate polymers can be specifically selected from acrylate oligomers with a diphenol propane structure, which are the product of the adductive polymerization of at least two monomers, such as 3000A, 3000MK, etc. from Kyoeisha, Japan;

The alkyl (meth) acrylate oligomers may specifically be homopolymers or copolymers with the alkyl (meth) acrylate monomers as structural units, such as a homopolymer of any one kind of alkyl (meth) acrylate monomer selected from the alkyl (meth) acrylate monomers above, or a copolymer of two or more kinds of alkyl (meth)acrylate monomers selected from the alkyl (meth)acrylate monomers above. Specific products include Bomar's hydrophobic acrylate polymers BR-643, BRC-841, BRC-843, BRC-843D, BR-952, BR-970BT, BR-970H, etc.

The cycloalkyl (meth) acrylate oligomers are homopolymers or copolymers with cycloalkyl (meth) acrylate monomers as structural units, such as a homopolymer of any one kind of cycloalkyl (meth) acrylate monomer selected from the cycloalkyl (meth) acrylate monomers above, or a copolymer of two or more kinds of cycloalkyl (meth) acrylate monomers selected from the cycloalkyl (meth) acrylate monomers above. The specific products include cyclohexyl epoxy triacrylate MEA-3 and cyclohexyl epoxy pentaacrylate MEA-4 from Miwon Corporation, Korea.

In the present disclosure, the photoinitiator used may specifically be a UV photoinitiator, and in particular may be a free radical type UV photoinitiator, provided that it is capable of generating free radicals that induce a polymerization reaction between the first acrylate component and the second acrylate component under UV light exposure.

Further, the UV photoinitiator can be hydrogen abstraction free radical photoinitiators and/or cracking free radical photoinitiators. The hydrogen abstraction free radical photoinitiators are selected from one or more of the benzophenonel tertiary amines and thioxanthone/tertiary amines; the cracking free radical photoinitiators are selected from one or more of the α-hydroxyketones, α-aminoketones, acylphosphine oxides and oxime esters.

As for the thioxanthone/tertiary amines hydrogen abstraction free radical photoinitiators, the preferred thioxanthone is ITX (isopropyl thioxanthone). There is at least one α-H in the molecular structure of tertiary amines co-initiators as the hydrogen provider of hydrogen abstraction free radical photoinitiators. Commonly used tertiary amines co-initiators may be tertiary amines benzoate and active amines, and the like. Wherein the tertiary amines benzoate includes N, N-dimethyl benzoic acid ethyl ester, N, N-dimethyl benzoic acid-2-ethylhexyl ester, benzoic acid dimethylamino ethyl ester, and so on; active amines are tertiary amines with acryloyloxy groups capable of involving in a cross-linking reaction. Commercially available products are reactive tertiary amine co-initiator 6420 from Eternal Materials, Genomer 5142 from Rahn corporation, EBECRYL 7100 from Cytec, and so on.

The cracking free radical photoinitiators may be, for example, α-hydroxyketone photoinitiators such as products with trade names of 1173 (2-hydroxy-2-methyl-1-phenylacetone), 184 (1-hydroxy-cyclohexyl benzophenone), 2959 (2-hydroxy-2-methyl-1-p-hydroxyethyl ether phenyl acetone), and so on; or may be α-aminoketones such as products with trade names of 907 (2-methyl-1-[4-methylthiophenyl]-2-morpholinyl-1-acetone), 369 (2-benzyl-2-dimethylamino-1-(4-morpholinephenyl)-1-butanone), and so on; or may be acylphosphine oxides such as products with trade names of TEPO (2,4,6-trimethylbenzoyl-ethoxy-phenylphosphine oxide), TPO (2,4,6-trimethylbenzoyl-diphenylphosphine oxide), 819 (bis (2,4,6-trimethylbenzoyl) phenylphosphine oxide); or may be oxime ester photoinitiators such as Irgacure OXE 01 and Irgacure OXE 02 from BASF.

In the present disclosure, the additive used may specifically be selected from at least one of toughening agents, defoamer agents, stabilizer agents and leveling agents. Other additives may be selected according to actual needs. Wherein:

the toughening agents can specifically be polycaprolactone tertiary alcohols and polyol products, such as 305T and 205N from eSUN and Greatech GT8003 from GOODCHEM;

the defoamer agents can be conventional defoamer agents, and there is no special limitation on the specific type of defoamer in the present disclosure, as long as it can eliminate the bubbles generated during the preparation and printing of light curing non-transparent material for 3D printing, so as to avoid the bubbles generated affect the fluency of printing. Defoamers such as silicone and polymer defoamer BYK-088, modified polysiloxane copolymer solution BYK-1798 from BYK, silicone free defoamers TEGO Airex 920, TEGO Airex 921 from RUCO can be selected;

the main function of the leveling agents is to promote the leveling of the print ink surface and reduce the disadvantages of shrinkage, traces, and so on, so as to obtain a smooth and flat surface. The leveling agent used in the present disclosure may be, BYK-333, BYK-371, BYK-377, etc. from BYK corporation;

the stabilizer agents (that is inhibitors) may further prevent the deposition of light curing non-transparent material for 3D printing and ensures the stability of light curing non-transparent material for 3D printing during storage. Commonly used stabilizer agents may be, for example, GENORAD 16, GENORAD 18, GENORAD 20, GENORAD 22, etc. from Rahn corporation.

The light curing non-transparent material for 3D printing provided by the present disclosure may also be selectively added with a colorant according to actual requirements, and the colorant can be specifically selected from at least one of dyes and pigments.

As mentioned above, for non-transparent materials, there are white materials and color non-transparent materials depending on the color presented by the printed test block. Specifically for the technical embodiments of the present disclosure, a white material or a color non-transparent material can be obtained based on the amount and type of colorant to be added, that is, the colorant can be added or not added according to the actual requirements.

For example, if a white material is required, the light curing non-transparent material for 3D printing may contain no colorants, which is colorless and transparent before printing, that is, having a very high transmittance in the whole visible light range (380~780 nm), and after being printed and cured, a white 3D printed product can be obtained.

For example, if a color non-transparent material is required, the light curing non-transparent material for 3D printing can contain an appropriate amount of blue, red, yellow or other colored colorant, which is colorful and transparent before printing, and after being printed and cured, a color non-transparent 3D printed product can be obtained.

Furthermore, the required transparency of the white 3D printed product and the color non-transparent 3D printed product can be achieved by adjusting the ratio between the first acrylate component and the second acrylate component, and/or selecting the two acrylate components with appropriate polarity.

The light curing non-transparent material for 3D printing provided in the present disclosure has viscosity of 30~65 cps at 25° C., surface tension of 20~35 dyn/cm at 25° C.; viscosity of 10~15 cps at 40~60° C. surface tension of 20~35 dyn/cm at 40~60° C., so that the material has a suitable viscosity for the print head to spray, which not only facilitates the printing, but also saves energy consumption, and effectively extends the service life of the print head.

The present disclosure also provides a preparation method for the light curing non-transparent material for 3D printing as described above, comprising:

blending the components except the photoinitiators to obtain a first mixture; then adding the photoinitiators to the first mixture until the photoinitiators being fully dissolved so as to obtain a second mixture; filtering the second mixture and collecting filtrate to obtain the light curing non-transparent material for 3D printing.

Where, the filtration of the second mixture as described above may be carried out in a plurality of filtrations, in particular in a stepwise manner. Specifically, the second mixture may be filtered at least twice by using a microporous membrane; wherein, an aperture diameter of the microporous membrane adopted in a first filtration is greater than that in a second filtration, and an aperture diameter of the microporous membrane adopted in the second filtration is less than an aperture diameter of a nozzle hole of a print head in a 3D inkjet printer, so as to ensure that the produced light curing non-transparent material for 3D printing has a good printing fluency, and the clogging of the nozzle hole of the print head can be avoided.

In the specific implementation of the present disclosure, the second mixture is treated by means of a two-stage filtration, wherein the first stage filtration uses a glass fiber membrane with a pore size of 0.45 μm and the second stage filtration uses a polypropylene membrane with a pore size of 0.22 μm.

In addition, the collected filtrate can be degassed. By degassing the filtrate, it further ensures the good fluency of the material in use and prevents the interference of air bubbles in the material, which can lead to the disconnection of the printing process and affect the forming accuracy of a 3D object.

Specifically, the degassing processing can be operated by decompression degassing, atmospheric degassing or heating degassing, or any two or more of these degassing methods can be selected. Generally, the time for the degassing processing is controlled not exceeding 5 hours, and in the specific implementation of the present disclosure, the degassing time is generally controlled to be 1 to 3 hours.

It will be appreciated that the preparation of the light curing non-transparent material for 3D printing of the present disclosure needs to be carried out in an environment outside the initiation wavelength range of the chosen photoinitiator, so as to avoid polymerization of the components in the materials being initiated by the light in the environment.

The present disclosure also provides a 3D printed product which is 3D printed by using a light curing non-transparent material for 3D printing as described above.

As mentioned above, the present disclosure provides a non-transparent material, so that the resulting 3D printed product is either a white product or a color non-transparent product.

Moreover, due to the good stability of the light curing non-transparent material for 3D printing, the nozzle hole of a print head will not be clogged during the printing process, and the fluency of the printing is good, so that 3D printed products with high precision can be obtained. In addition, the use of the light curing non-transparent material for 3D printing further ensures the 3D printed products having low print shrinkage and excellent mechanical properties, especially impact strength and toughness, and further guarantees the quality of 3D printed products.

The present disclosure further provided a 3D printer, which comprises: an inkjet print head, a material container and a connecting device used to connect the inkjet print head and the material container, wherein the light curing non-transparent material for 3D printing is contained in the material container.

Specifically, the number of material containers for the above-mentioned materials may be set according to the types of light curing non-transparent material, and it is not specifically limited herein. The above-mentioned connecting device can specifically be a connecting tube or other forms of connecting devices, as long as the above-mentioned functions can be achieved. The inkjet print head can be single-channel or multi-channel print head, or a combination of a single-channel and multi-channel print head.

Further, said 3D printer may further comprise a controller capable of controlling the supply of ink to the inkjet print head from the material container, i.e. by means of which the light curing non-transparent material for 3D printing placed in the material container is fed to the inkjet print head through the connecting device and eventually ejected through the nozzle hole of the inkjet print head for printing.

Further, the above 3D printers can also include a UV light source, which can specifically be a UV light emitting diode.

In general, it is possible to control the ultraviolet light source through the controller to make the ultraviolet light source irradiate the layer formed by the non-transparent material for 3D printing to achieve curing.

The light curing non-transparent material for 3D printing provided by this disclosure possess following advantages:

1. The components of the non-transparent material do not need to add titanium white powder and other white pigments to obtain the non-transparent material, thus avoiding the adverse effects of titanium dioxide deposition on the stability of non-transparent material, improving the printing fluency, solving the problems such as deteriorated printing precision, or incomplete structural printing in 3D printing process that using traditional non-transparent material due to the clog of the nozzle hole of the print head or disconnection of the printing process, thus high-quality 3D printing products can be obtained, and the cost for 3D printer operation and maintenance can be reduced.

2. By flexibly adjusting the ratio between the first acrylate component and the second acrylate component, and/or selecting two acrylate components with appropriate polarity, it is possible to obtain 3D printed products with different light transmittance, which not only further eliminates the dependence of non-transparent materials on the titanium white powder, but also broadens the application range of the non-transparent materials.

3. Regular inkjet printing can be achieved at lower operating temperature such as 40° C.~60° C., effectively saving energy and extending the service life of the print head.

4. The 3D printing products printed with the light curing non-transparent material for 3D printing have the advantage of high precision, a dimensional shrinkage of less than 5%, and the Shore hardness of more than 90%, bending strength of more than 75 MPa, bending modulus of more than 2100 MPa, impact strength (notched impact strength of the simple supported beam) of more than 20 KJ/m$^2$, so that the 3D printed products have good mechanical properties to meet the actual needs.

5. The light curing non-transparent materials used for 3D printing are free of volatile solvents and almost all the components added are involved in curing, no VOC emissions and no pollution.

The present disclosure provides a preparation method for the light curing non-transparent materials for 3D printing, and the method has a simple and feasible preparation process, which facilies practical application and generalization in industry.

The 3D printed product provided by the present disclosure has very high accuracy, low shrinkage and good mechanical properties due to the use of the light curing non-transparent material for 3D printing mentioned above as raw material.

The 3D printer provided by the present disclosure has a material container contains the above-mentioned light curing non-transparent material for 3D printing, so it has the characteristics of good printing fluency, the nozzle hole of the print head cannot be easily clogged, and can work normally at a low operating temperature (e.g. 40° C.~60° C.), which not only makes the 3D printer have good performance and long service life, but also can obtain high-quality 3D printed products.

BRIEF DESCRIPTION OF DRAWING(S)

FIG. 1 is a structure schematic diagram of a 3D printer provided by example 6 of this disclosure.

DESCRIPTION OF REFERENCE NUMBERS

1: Material containers; 2: Inkjet print head; 3: Connecting device;
4: Controller; 5: UV light source; 6: Material layer.

DESCRIPTION OF EMBODIMENTS

The technical solutions in the embodiment examples of present disclosure will be clearly and completely described in following with reference to the accompanying drawings of the embodiment examples of present disclosure such that the object, technical solution and advantage of the embodiment examples of present disclosure will be more clearly understood. Obviously, embodiment examples disclosed hereafter are merely a part of the embodiment examples of present disclosure and not all. Based on the embodiment examples of present disclosure, other embodiment examples obtained by the skilled in the art without making any inventive effort fall into the scope protected by the present disclosure.

Example 1

The example provides a light curing non-transparent material for 3D printing, which has the following composition of table 1:

TABLE 1

| Components | Compounds/trade name | Weight |
|---|---|---|
| First acrylate component | CN9021 NS (oligomer) | 25.6 g |
| | Acryloyl morpholine | 20 g |
| Second acrylate component | Isobornyl acrylate | 30.6 g |
| | Stearic acrylate | 15 g |
| Photoinitiator | TPO (acyl phosphine oxide free radical photoinitiator) | 2.78 g |
| Additives | GENORAD16 (stabilizer agent) | 0.5 g |
| | BYK-377 (leveling agent) | 0.02 g |
| | 305T (toughening agent) | 5.5 g |

The preparation method of the light curing non-transparent material for 3D printing is as follows:

(1) The components other than the photoinitiator are placed in a glass container and stirred by a stirrer, so as to obtain a well-mixed first mixture; the photoinitiator is then added to the first mixture and stirred until the photoinitiator is completely dissolved, so as to obtain a second mixture;

(2) The second mixture was filtered with a 0.45 μm glass fiber membrane for a primary filtration and a 0.22 μm polypropylene membrane (PP membrane) for a secondary filtration to obtain a filtrate;

(3) The filtrate is subjected to decompress filtration at a vacuum of 0.1 MPa for 1 hour to remove the air bubbles therein, then the light curing white material for 3D printing is obtained and it is translucent.

Example 2

The example provides a light curing non-transparent material for 3D printing, which has the following composition of table 2:

TABLE 2

| Components | Compounds/trade name | Weight |
|---|---|---|
| First acrylate component | Greatech GT-8270 (oligomer) | 45 g |
| | 2-hydroxyethyl acrylate | 20 g |
| Second acrylate component | BR-970BT (oligomer) | 10 g |
| | 1-adamantyl methacrylate | 22 g |
| Photoinitiator | TEPO (acyl phosphine oxide free radical photoinitiator) | 2.4 g |
| Additives | BYK-088 (defoamer agent) | 0.4 g |
| | ZJ-701 (stabilizer agent) | 0.2 g |

In this example, the preparation method of the light curing non-transparent material for 3D printing is basically the same as that of Example 1, except that the components used are replaced accordingly. And step (3) uses heat degassing for degassing treatment, the filtrate obtained from step (2) is heated to 40° C. for degassing, and the degassing time is 50 min.

In this example, a light curing white material for 3D printing is obtained, and it is completely opaque.

Example 3

The example provides a light curing non-transparent material for 3D printing, which has the following composition of table 3:

TABLE 3

| Components | Compounds/trade name | Weight |
|---|---|---|
| First acrylate component | Tetrahydrofuran acrylate | 41 g |
|  | Ethoxyethoxyethyl acrylate | 28 g |
| Second acrylate component | Bisphenol A acrylate 3000A (oligomer) | 20 g |
| Photoinitiator | Isopropyl thioxanthone | 3.6 g |
|  | 6420 of Taiwan Eternal Materials Co., Ltd. | 1.2 g |
| Additives | Greatech GT8003 (toughening agent) | 3.6 g |
|  | TEGO Airex 920 (defoamer agent) | 0.4 g |
|  | ZJ-701 (stabilizer agent) | 0.2 g |
| Colorant | Bronze red (PR21) red pigment | 2 g |

In this embodiment, the preparation method of the light curing non-transparent material for 3D printing is basically the same as that of Example 1, except that the components used are replaced accordingly, and the specific time for decompress degassing in step (3) is adjusted to 2 hours.

A light curing red opaque material for 3D printing is obtained in this example.

Example 4

The example provides a light curing non-transparent material for 3D printing, which has the following composition of table 4:

TABLE 4

| Components | Compounds/trade name | Weight |
|---|---|---|
| First acrylate component | 6101 (oligomer) of Taiwan Eternal Materials Co., Ltd. | 31.5 g |
| Second acrylate component | BR-952 (oligomer) | 20 g |
|  | lauric acrylate | 36 g |
| Photoinitiator | 819 (acyl phosphine oxide free radical photoinitiator) | 0.5 g |
| Additives | Greatech GT8003 (toughening agent) | 7 g |
|  | Modified polysiloxane polymer BYK-333 | 0.4 g |
|  | GENORAD 20 (stabilizer agent) | 0.6 g |
| Colorant | Phthalocyanine blue (PB15:3) blue pigment | 4 g |

In this embodiment, the preparation method of the light curing non-transparent material for 3D printing is basically the same as that of Example 1, except that the components used are replaced accordingly, and step (3) uses atmospheric pressure static degassing for degassing treatment, the standing time is 3 h.

A light curing blue opaque material for 3D printing is obtained in this example.

Example 5

The example provides a light curing non-transparent material for 3D printing, which has the following composition of table 5:

TABLE 5

| Components | Compounds/trade name | Weight |
|---|---|---|
| First acrylate component | 2-hydroxyethyl acrylate | 31 g |
|  | Phenolic epoxy acrylate | 20 g |
| Second acrylate component | Isobornyl methacrylate | 40 g |
| Photoinitiator | TPO (acyl phosphine oxide free radical photoinitiator) | 2.5 g |
|  | 184 (α-hydroxyketone free radical photoinitiator) | 2.5 g |

TABLE 5-continued

| Components | Compounds/trade name | Weight |
|---|---|---|
| Additives | TEGO Airex 921 (defoamer agent) | 0.3 g |
|  | PM2010 (stabilizer agent) | 0.2 g |
| Colorant | Pigment Yellow 185 (PY185) yellow pigment | 3.5 g |

In this embodiment, the preparation method of the light curing non-transparent material for 3D printing is basically the same as that of Example 1, except that the components used are replaced accordingly, and step (3) uses heat degassing for degassing treatment, the filtrate obtained from step (2) is heated to 50° C. for degassing, and the degassing time is 30 min.

A light curing yellow opaque material for 3D printing is obtained in this example.

Comparative Example 1

This Comparative example provides a light curing material for 3D printing, which has the following composition of table 6:

TABLE 6

| Components | Compounds/trade name | Weight |
|---|---|---|
| First acrylate component | CN9021 NS (oligomer) | 25.6 g |
|  | 6101 (oligomer) of Taiwan Eternal Materials Co., Ltd. | 31.6 g |
|  | Acryloyl morpholine | 40 g |
| Photoinitiator | TPO (acyl phosphine oxide free radical photoinitiator) | 2.78 g |
| Additives | GENORAD16 (stabilizer agent) | 0.5 g |
|  | BYK-377 (surfactant agent) | 0.02 g |
|  | 305T (toughening agent) | 5.5 g |

In this Comparative example 1, the preparation method of the light curing material for 3D printing is basically the same as that of Example 1, except that the components used are replaced accordingly.

Polar acrylate monomer and polar acrylate oligomer are used as the acrylate component in Comparative example 1, and a light curing transparent materials for 3D printing is obtained.

Comparative Example 2

This Comparative example provides a light curing material for 3D printing, which has the following composition of table 7:

TABLE 7

| Components | Compounds/trade name | Weight |
|---|---|---|
| Second acrylate component | BR-952 (oligomer) | 25 g |
|  | 3000A (oligomer) | 10 g |
|  | Lauric acrylate | 26 g |
|  | Isobornyl methacrylate | 27 g |
| Photoinitiator | 819 (acyl phosphine oxide radical photoinitiator) | 0.5 g |
| Additives | Greatech GT8003 (toughening agent) | 7 g |
|  | BYK-377 (leveling agent) | 0.4 g |
|  | GENORAD 20 (stabilizer agent) | 0.6 g |
| Colorant | Phthalocyanine blue (PB15:3)blue pigment | 3.5 g |

In this Comparative example 2, the preparation method of the light curing material for 3D printing is basically the same as that of Example 4, except that the components used are replaced accordingly.

Weakly/non-polar acrylate monomers or oligomers are used as the acrylate component in Comparative example 2, and a light curing transparent blue materials for 3D printing is obtained.

Performance testing of the light curing materials for 3D printing in the above examples and the Comparative examples are carried out:

1. The viscosity and surface tension of the ink composition in the example were tested at room temperature and operating temperature by using a DV-I digital viscometer and a BZY-1 automatic surface tension meter.

2. The ink composition of the example is applied to a 3D light curing inkjet printer with an industrial jet nozzle, and the wavelength of the UV light source is set as 395 nm, and the ink fluency test and the accuracy test of the molded parts are carried out at the appropriate injection temperature, respectively, the accuracy test is mainly reflected by the volume shrinkage, the testing method is:

The density $\rho1$ before curing and $\rho2$ after complete curing of the photosensitive resin was determined at 25° C. using the specific gravity bottle method with water as a reference, the volumetric shrinkage is calculated with the following equation:

volumetric shrinkage %=$(\rho_2-\rho_1)\div\rho_2\times100\%$

3. Testing of the Light Transmittance

The ink composition of this example is applied to a 3D light curing inkjet printer with an industrial jet nozzle, and the wavelength of the UV light source is set as 395 nm, and a 50 mm×50 mm block with a thickness of 2 mm is printed at the injection temperature.

The light transmittance is measured by a UV spectrophotometry, the light transmittance is the ratio of the light flux through the specimen to the light flux irradiated on the specimen, expressed as a percentage. For specific testing methods, refer to GB/T 2410-2008, Measurement of light transmittance and haze of transparent plastics.

4. Testing of Shore Hardness

The ink composition of this example is applied to a 3D light curing inkjet printer with an industrial jet nozzle, and the wavelength of the UV light source is set as 395 nm, a 50 mm×50 mm block with a thickness of 6.4 mm is printed at the injection temperature, the Shore hardness of the block is measured. For the specific testing methods, refer to GB/T2411-2008, Indentation hardness (Shore hardness) of plastics and hard rubber is measured by using a hardness tester.

5. Testing of Bending Performance

Bending properties are used to indicate the ability of a material to resist flexural deflection or the rigidity of a tested material. The ink composition of this example is applied to a 3D light curing inkjet printer with an industrial jet nozzle and the wavelength of the UV light source is set as 395 nm, and a long block with length×width×thickness of 80 mm×10 mm×4 mm is printed at the injection temperature, its bending performance is tested. For the specific testing methods, refer to GB/T 9341-2008, Determination of the bending performance of plastics.

6. Testing of the Impact Strength

Impact strength is a measure for a material's toughness, usually defined as the energy absorbed by per unit of the cross-sectional area when a specimen is broken or fractured under an impact load. For the specific testing method, refer to GB/T1043.1-2008, Part 1 of the Impact performance determination of a plastic simple supported beam: non-instrumental impact testing.

The testing results of each performance are shown in table 8 below:

TABLE 8

| Parameters of the performances | Examples | | | | | Comparative example 1 | Comparative example 2 |
|---|---|---|---|---|---|---|---|
| | Example 1 | Example 2 | Example 3 | Example 4 | Example 5 | | |
| Viscosity at room | 45.6 | 62.1 | 35.8 | 60.1 | 32.5 | 50.4 | 40.2 |
| Surface tension at room | 23.9 | 30.6 | 29.8 | 23.5 | 29.2 | 24.5 | 23.4 |
| Injection temperature | 50 | 60 | 45 | 55 | 40 | 55 | 50 |
| Viscosity at the Injection temperature | 12.4 | 12.1 | 12.6 | 12.8 | 11.8 | 10.9 | 11.2 |
| Surface tension at the injection temperature | 23.7 | 29.8 | 29.4 | 22.7 | 28.9 | 24.2 | 22.9 |
| Shrinkage | 3.75 | 3.14 | 4.25 | 3.25 | 4.57 | 3.54 | 4.15 |
| Fluency | OK | OK | OK | OK | OK | OK | OK |
| Light transmittanc | 51.47 | 5.6 | 4.2 | 76.8 | 39.8 | 91 | 87 |
| Shore | 92 | 96 | 91 | 95 | 90 | 92 | 89 |
| Bending strength | 82 | 89 | 80 | 85 | 75 | 83 | 72 |
| Bending modulus | 2421 | 2651 | 2254 | 2500 | 2124 | 2412 | 2105 |
| Impact strength | 30 | 38 | 40 | 24 | 35 | 15 | 17 |

It can be seen from the results of the above testing:

1. Using the light curing non-transparent materials for 3D printing provided by the present disclosure, the light transmittance values of the test blocks are all below 80%.

Furthermore, by adjusting the ratio of the first acrylate component to the second acrylate component and the polarity of the two components, it is possible to obtain non-transparent objects with different light transmittance. If the first acrylate component and the second acrylate component are not both included, e.g. only the polar acrylate component or the weakly polar/non-polar acrylate component is included, the light transmittance values of the test blocks are all greater than 80%, i.e. the light curing materials are transparent materials.

2. For the test blocks printed by using the light curing non-transparent materials for 3D printing provided by the present disclosure, the Shore hardness values are all above 90%, the bending strength values are above 75 Mpa, the bending modulus values are above 2100 Mpa, the impact strength values are above 20 $KJ/m^2$, indicating that the objects printed by using the materials have high hardness, good bending properties, especially outstanding impact strength and toughness, that is, the 3D printed products have good mechanical properties to meet practical needs.

3. The light curing non-transparent material for 3D printing provided by the present disclosure has good printing smoothness, no clog of the nozzle hole of the print head or disconnection of the printing process, and the shrinkage rate of the printed object is less than 5%, thus the accuracy of the printed object is high.

4. The light curing non-transparent material for 3D printing provided by the present disclosure has low viscosity at room temperature and operating temperature (40~60° C.), and low injection temperature, which is not only suitable for 3D printing, but also able to extend the service life of 3D printer.

Example 6

This example provides a 3D printer, specifically a 3D inkjet printer. The structure schematic diagram of the 3D printer is shown in FIG. 1, which comprises a material container 1, an inkjet print head 2 and a connecting device 3, where:

The light curing non-transparent material for 3D printing provided by any one of examples 1~5 is stored in the material container 1;

The connecting device 3 is used to connect the material container 1 and the inkjet print head 2, the light curing non-transparent material for 3D printing stored in material container 3 is supplied to the inkjet print head 2 via the connecting device 3;

The light curing non-transparent material for 3D printing injected from the inkjet print head 2 is cured to form a light curing layer on a bearing platform (not shown).

The number of the material containers 1 is not specifically limited in this example, and the number of material containers 1 can be set according to the types of light curing non-transparent materials. The inkjet print head 2 can be a single-channel print head or a multi-channel print head, or it can be a combination of a single-channel print head and a multi-channel print head.

Further referring to FIG. 1, the 3D printer provided by this example may further comprise: a controller 4 and a UV light source 5, wherein the controller 4 is capable of controlling the supply of the light curing non-transparent material for 3D printing from the material container 1 to the inkjet print head 2, and controlling the UV radiation curing of the material layer 6 injected on the bearing platform by the UV light source 5 so as to form a light curing layer; the specific UV light source 5 may be a UV light emitting diode.

Example 7

This example provides a 3D product, which is printed by using the light curing non-transparent material for 3D printing provided by any one of examples 1~5.

Specifically, 3D printed products with different colors can be printed according to the requirements, for example, by supplying the materials in examples 1-5 above to the printer J501 of Seine or the 3D printer provided in example 6 above, white objects, red non-transparent objects, blue non-transparent objects and yellow non-transparent objects can be printed respectively. Of course, it is also possible to mix the materials in the above examples in a certain proportion to obtain non-transparent 3D printed products with other colors.

What shall be clarified is that the above-described embodiments are merely illustrative of several implementing schemes of the disclosure, but should not be construed as limiting the scope of the present disclosure. It should be noted that variations and modifications may be made by those skilled in the art without departing from the concept of the present disclosure. Therese variations and modifications all fall into the protection scope of the present disclosure. Therefore, the scope of the present disclosure should be subject to the appended claims.

What is claimed is:

1. A light curing non-transparent material for 3D printing, comprising components as follows:

30 to 70 parts by weight of a first acrylate component, 20 to 60 parts by weight of a second acrylate component, 0.5 to 5 parts by weight of a photoinitiator, 0.5 to 8 parts by weight of an additive, and 0 to 4 parts by weight of a colorant; wherein the first acrylate component is a polar acrylate component, and the second acrylate component is selected from at least one of a weakly polar acrylate component and a non-polar acrylate component;

wherein dielectric constant of the first acrylate component is greater than or equal to 3.6, dielectric constant of the second acrylate component is less than or equal to 3.

2. The light curing non-transparent material for 3D printing according to claim 1, wherein a weight ratio between the second acrylate component and the first acrylate component is less than 2:1.

3. The light curing non-transparent material for 3D printing according to claim 1, wherein the first acrylate component is selected from at least one of polar acrylate oligomers and polar acrylate monomers;

the second acrylate component is selected from at least one of acrylate oligomers with dielectric constant less than or equal to 3 and acrylate monomers with dielectric constant less than or equal to 3.

4. The light curing non-transparent material for 3D printing according to claim 3, the polar acrylate oligomers are selected from at least one of aliphatic polyurethane acrylate oligomers and epoxy acrylate oligomers;

the polar acrylate monomers are selected from at least one of hydroxyalkyl acrylate monomers, alkoxylated acrylate monomers and acrylate monomers with a heterocyclic structure.

5. The light curing non-transparent material for 3D printing according to claim 3, wherein the polar acrylate oligomers are aliphatic polyurethane acrylate oligomers and/or epoxy acrylate oligomers with at least one group selected from cyano, carboxyl, hydroxyl, acetylamino, amino and sulfydryl groups.

6. The light curing non-transparent material for 3D printing according to claim 4, wherein the hydroxyalkyl acrylate monomers are selected from at least one of 2-hydroxyethyl acrylate, 2-hydroxypropyl acrylate and 4-hydroxybutyl acrylate;
the alkoxylated acrylate monomers are selected from at least one of 2-acrylic-2-methoxy ester, ethoxyethoxyethyl acrylate, methoxy (polyethylene glycol) monoacrylate, methoxy (polyethylene glycol) methacrylate and alkoxylated nonylphenol acrylate;
the acrylate monomers with a heterocyclic structure are selected from at least one of tetrahydrofuran acrylate, 2-phenoxyethyl acrylate, (2-ethyl-2-methyl-1, 3-dioxolan-4-yl) acrylate and acryloyl morpholine.

7. The light curing non-transparent material for 3D printing according to claim 3, wherein
the acrylate monomers with dielectric constant less than or equal to 3 are selected from at least one of bisphenol A acrylate monomers, alkyl (meth) acrylate monomers and cycloalkyl (meth) acrylate monomers;
the acrylate oligomers with dielectric constant less than or equal to 3 are selected from at least one of bisphenol A acrylate oligomers, alkyl (meth) acrylate oligomers and cycloalkyl (meth) acrylate oligomers.

8. The light curing non-transparent material for 3D printing according to claim 7, wherein
the bisphenol A acrylate oligomers are selected from acrylate oligomers with a diphenol propane structure;
the alkyl (meth) acrylate oligomers are homopolymers or copolymers with the alkyl (meth) acrylate monomers as structural units;
the cycloalkyl (meth) acrylate oligomers are homopolymers or copolymers with cycloalkyl (meth) acrylate monomers as structural units.

9. The light curing non-transparent material for 3D printing according to claim 7, wherein,
the bisphenol A acrylate monomers are selected from acrylate monomers with a diphenol propane structure;
the alkyl (meth) acrylate monomers are selected from at least one of butyl acrylate, n-octyl acrylate, isooctyl acrylate, isoctadecyl acrylate, isononyl acrylate, lauric acrylate, isodecyl acrylate, isodecyl methacrylate ester, stearic acrylate, dodecyl methacrylate and isotridecyl methacrylate;
the cycloalkyl (meth) acrylate monomers are selected from at least one of isobornyl acrylate, isobornyl methacrylate, 1-adamantyl methacrylate, 4-tert-butyl cyclohexyl acrylate and cyclohexyl methacrylate.

10. The light curing non-transparent material for 3D printing according to claim 1, wherein the photoinitiator is selected from free radical UV photoinitiators.

11. The light curing non-transparent material for 3D printing according to claim 1, wherein the additive is selected from at least one of toughening agents, defoamer agents, stabilizer agents and leveling agents.

12. The light curing non-transparent material for 3D printing according to claim 1, wherein the colorant is selected from at least one of dyes and pigments.

* * * * *